United States Patent
Gold

[19]

[11] Patent Number: 5,163,731
[45] Date of Patent: Nov. 17, 1992

[54] VEHICLE REFLECTIVE MOLDING

[76] Inventor: Peter Gold, 389 Peninsula Blvd., Hempstead, N.Y. 11550

[21] Appl. No.: 859,907

[22] Filed: Mar. 30, 1992

[51] Int. Cl.⁵ .............................................. B60J 1/00
[52] U.S. Cl. .................................. 296/201; 293/128; 116/28 R; 296/1.1
[58] Field of Search ........................ 296/1.1, 201, 93; 293/120, 128, 117; 116/28 R; 52/315

[56] References Cited

U.S. PATENT DOCUMENTS

| 3,590,768 | 7/1971 | Shanok | 116/28 |
| 4,626,022 | 12/1986 | Booker | 296/128 |
| 5,078,444 | 1/1992 | Shirahata et al. | 296/93 |

FOREIGN PATENT DOCUMENTS 58-48549  4/1983  Japan .

Primary Examiner—Robert R. Song

[57] ABSTRACT

A vehicle rear window reveal molding provided with a rearwardly facing groove serving as a repository for reflective material in which the overhang of an upper leg of the groove shelters the reflective material against ultraviolet deterioration but allows clear visibility thereof in its activated state when it emits light in response to ground level light of headlights from approaching vehicles impinging on the reflective material.

2 Claims, 1 Drawing Sheet

VEHICLE REFLECTIVE MOLDING

The present invention relates to improvements in vehicle rear window safety reflective means, and more particularly to a reflective so-called reveal rear window molding with a significantly prolonged period of use because it is inactive during the daytime when it is not needed, and active during the night time when, of course, it is needed.

Example of the Prior Art

Light displays that provide warnings to vehicles approaching from the rear are disclosed in many variations in the prior patented literature. Pertinent to the within inventive light-emitting molding is U.S. Pat. No. 3,590,768 which issued to Shanok, et al., on Jul. 6, 1971 disclosing a clear plastic frame 12 which is adhesively secured over the reveal molding through which an observer from the rear sees a silver foil strip 16 during the day, and a light-reflecting tape 18 at night. There is no provision in Shanok to protect tape 18 from ultraviolet deterioration caused by daytime sunlight.

Broadly, it is an object of the present invention to provide a vehicle reflective molding overcoming the foregoing and other shortcomings of the prior art. More particularly, it is an object to design the fabrication of the molding using its usual construction method of extrusion so that the repository for the reflective material is sheltered against ultraviolet deterioration but clearly visible when responding to activation by ground level light of headlights from approaching vehicles impinging on the reflective material.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
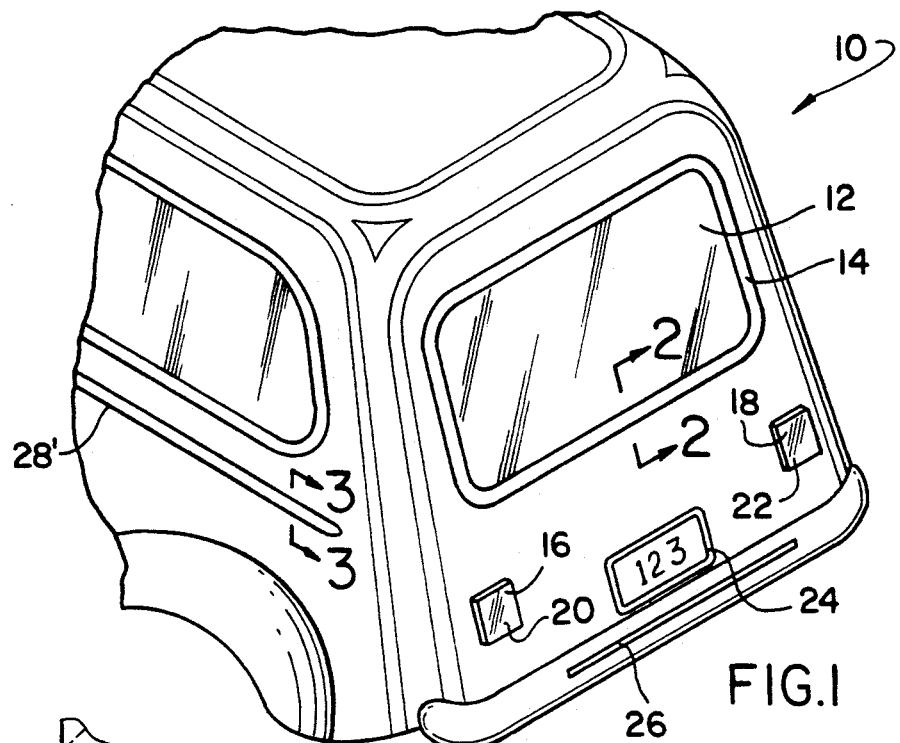
FIG. 1 is a partial perspective view of the within inventive rear window molding installed on a vehicle.

In FIG. 1 the rear of a vehicle 10 will be understood to have a permanently mounted rear window 12 surrounded by a reveal molding 14.

Vehicle 10, as well as all contemporary conventional road vehicles, has as a warning of its presence to vehicles approaching from the rear at least a left side rear light 16 and right side rear light 18. During night time driving conditions, lights 16 and 18 are usually illuminated, but as oftentimes happens the driver may forget to turn on the lights, they may become inoperable or the vehicle could be hazardously parked with the lights off. When lights 16 and 18 are not visible, the drivers of oncoming vehicles must depend only on the reflective characteristics of the plastic lenses 20, 22 covering the lights 16 and 18. On occasion, one or both the rear lenses 20,22 covering the lights 16 and 18 may be missing, become deteriorated, or are obscured or otherwise not properly detected with obvious adverse consequences.

Additional devices are currently available to add reflective areas to vehicle surfaces, such as, reflecting license plate mounting frames 24 and reflecting tape 26. Most vehicle owners, however, find these means to be detracting or even damaging to their vehicles especially as these devices degenerate due to weathering.

Figure 2:
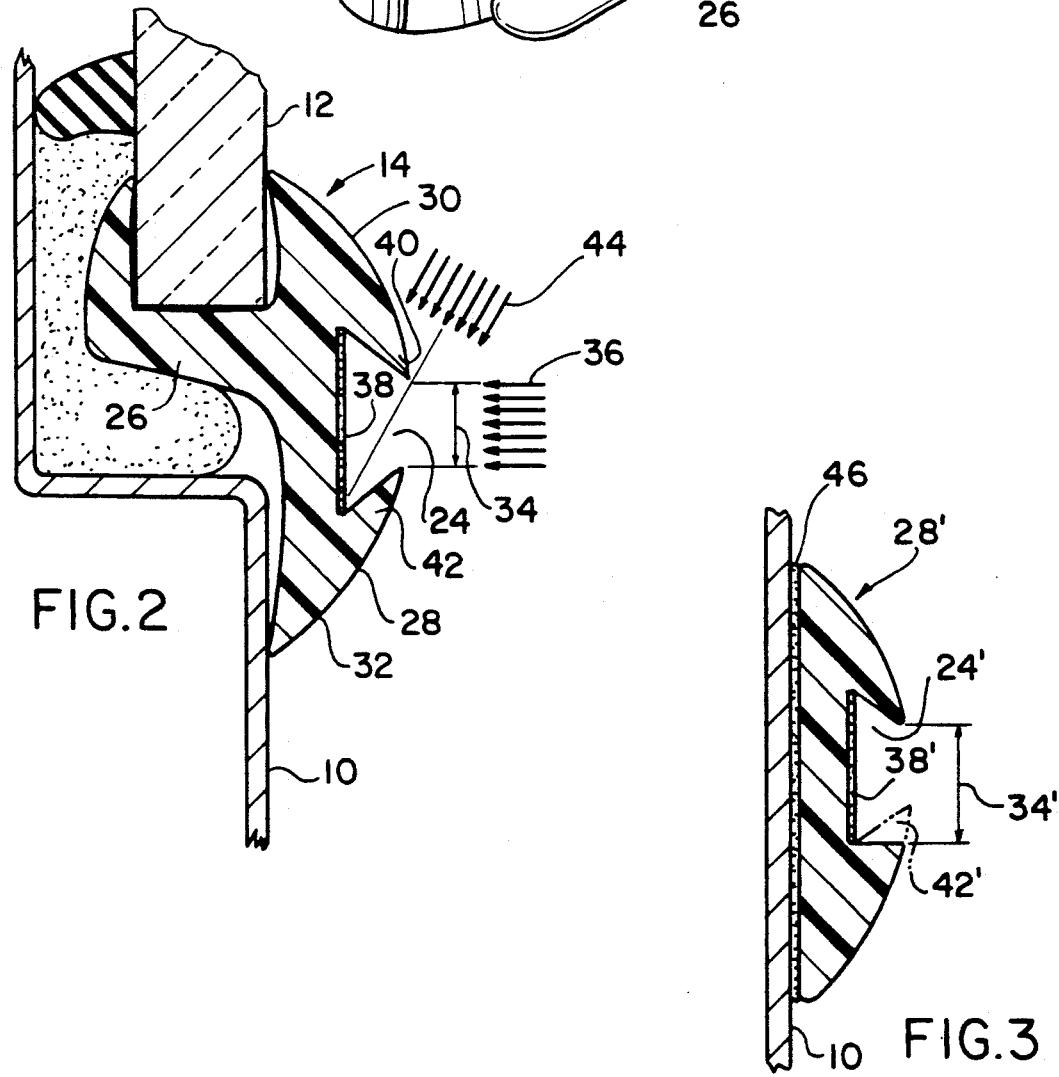
FIG. 2 is a detail cross sectional view as taken along line 2—2 of FIG. 1.

In FIG. 2 a typical extruded type window reveal molding 14 of elastomeric construction material is shown in detail in cross sectional perspective with the addition of a c-shaped groove serving as a reflective material recess 24. Molding 14 has the usual anchoring means 26 and crown member 28. As is customary, means 26 divides crown 28 into two sections. In this case, the section 30, inboard to window 12, is also separated from the outboard section 32 by a dovetail shaped groove 24 which is more particularly defined by a rearwardly located surface 38 and a forwardly extending pair of an upper leg 40 and lower leg 42. Groove 24 legs 40 and 42 bound therebetween an opening 34 which permits light rays 36 to impinge on colored reflective material disposed on the surface 38 which responding in accordance with a wall understood chemical reaction to the impinging light becomes visible to the drivers of oncoming vehicles. Surface 38 is made of one of many available reflective, phosphorescent or fluorescent materials. One such material is a reflective paint supplied by DUPLI-COLOR Products Co., Elk Grove Village, Ill. 60007 currently used for marking roadside obstacles, hazards, curbs and parking areas.

Adjacent each side of opening 34, legs 40,42 are sized and advantageously located to protect surface 38 from weathering, and particularly upper leg 40 from effects of UV radiation from which, as is well understood, reflective materials suffer actinic deterioration over time. This deterioration is proportional to the direct exposure of material 38 to sunshine. In studying FIGS. 1 and 2, it should be readily appreciated that any sunshine that reaches surface 38 in the direction 36, will be weak in nature, because it can only be early morning or late day radiation, since this necessarily follows from the fact that molding 14 is oriented horizontally. Only when opening 34 is oriented along an east-west axis facing upward, can strong noontime rays 44 reach surface 38 for a prolonged period, and this access to the reflective material 38 in the direction 44 is blocked by the interposed overhanging position of upper leg 40 in relation to the rearwardly located material 38.

Therefore when a molding 14 with its sheltered reflector 38 is installed on a vehicle 10 in accordance with the present invention, the reflective material 38 is inactive during the day time and only activated by ground level light from the headlights of approaching vehicles during the night time, which significantly prolongs its light-emitting capability or service.

Figure 3:
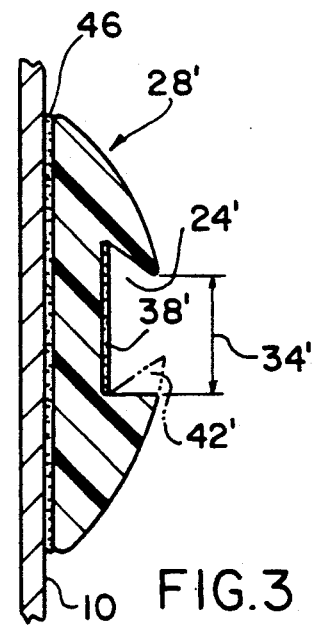
FIG. 3 is a detail cross sectional view as taken along line 3—3 also of FIG. 1.

Although not as important a safety feature as the within inventive molding surrounding the rear window, other locations are also recommended. For example, shown in FIGS. 1 and 3 is a door bumper strip 28' connected along the side of vehicle 10 by adhesive 46. Strip 28' can also be provided with a groove 24' which shelters a reflective surface 38'. Opening 34' can be made somewhat larger than opening 34 in strip 14 because a leg or lip 42' is not needed. Since molding 28 is a continuous extrusion, lip 42 becomes the sheltering lip when strip 28 is used along the top edge of window 12 and functions as did lip 40 when strip 28 is used along the lower edge of window 12.

While the vehicle window molding herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a vehicle rear window molding of the type consisting of an extrusion of elastomeric construction material having an operative position disposed about the peripheral edge of said rear window so as to be in spanning relation across a gap between said peripheral edge and an edge bounding an opening in said vehicle receiving said rear window whereby said molding serves as a weather seal for said rear window, said improvements to said molding providing a visual display warning of the presence of said vehicle in the path of an approaching vehicle comprising an extrusion-impaired c-shaped groove extending lengthwise of said molding in an exterior surface thereof facing rearwardly of said vehicle, said c-shape configuration presenting a rearwardly located surface in said groove and an upper and lower pair of legs on opposite sides of said surface forwardly extending therefrom and bounding therebetween an opening through which a rearwardly positioned observer can visually perceive said groove rearwardly located surface, a light-emitting material disposed on said groove rearwardly located surface of the type chemically effective to emit light in response to light impinging thereon, and said groove upper leg being sized and positioned in overhanging relation to said light-emitting material to block passage through said groove opening of overhead sunlight while allowing the passage therethrough of ground level light from vehicle headlights, whereby said light-emitting material which is active during the night time is inactive during the day time which prolongs its light-emitting service.

2. A molding providing a visual display as claimed in claim 1 wherein said light-emitting material is a painted-on coating on said rearwardly located surface of said groove.

* * * * *